US007694215B2

(12) United States Patent
Taylor

(10) Patent No.: US 7,694,215 B2
(45) Date of Patent: *Apr. 6, 2010

(54) METHOD AND APPARATUS FOR PROVIDING SPONSORSHIP FOR A DIRECTORY

(75) Inventor: Esme M. Taylor, Sausalito, CA (US)

(73) Assignee: Yellow Pages Superhighway, Inc., Novato, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 11/398,404

(22) Filed: Apr. 4, 2006

(65) Prior Publication Data

US 2006/0184453 A1    Aug. 17, 2006

Related U.S. Application Data

(62) Division of application No. 09/524,849, filed on Mar. 14, 2000, now Pat. No. 7,467,348.

(51) Int. Cl.
*G06F 17/00* (2006.01)
*G06F 17/24* (2006.01)
*G06F 17/30* (2006.01)
*G06Q 30/00* (2006.01)

(52) U.S. Cl. .................. 715/205; 715/200; 715/203; 715/206; 715/208; 715/234; 715/255; 707/2; 707/3; 707/10; 705/14; 705/26; 705/37; 705/400; 705/404

(58) Field of Classification Search .............. 705/1, 705/52–53, 37, 78, 80, 400, 14, 26, 404; 715/234, 271, 273, 200, 203, 205, 206, 208, 715/255; 707/1, 2, 6, 3, 10
See application file for complete search history.

(56) References Cited

U.S. PATENT DOCUMENTS

| 5,724,521 | A  | * | 3/1998  | Dedrick .................. 705/26 |
| 6,009,410 | A  | * | 12/1999 | LeMole et al. .......... 705/14 |
| 6,098,065 | A  | * | 8/2000  | Skillen et al. ............ 707/3 |
| 6,212,554 | B1 | * | 4/2001  | Roskowski ............. 709/217 |
| 6,247,047 | B1 | * | 6/2001  | Wolff .................... 709/219 |
| 6,253,189 | B1 | * | 6/2001  | Feezell et al. ............ 705/14 |
| 6,269,361 | B1 | * | 7/2001  | Davis et al. .............. 707/3 |
| 6,295,526 | B1 | * | 9/2001  | Kreiner et al. ............ 707/2 |

(Continued)

OTHER PUBLICATIONS

Matthew K Franklin and Michael K. Reiter, "The Design and Implementation of a Secure Auction Service", 1995, Proceeddings, IEEE Sysmposium on May 8-10, 1995, pp. 2-14.*

*Primary Examiner*—Laurie Ries
*Assistant Examiner*—Chau Nguyen
(74) *Attorney, Agent, or Firm*—Dergosits & Noah LLP

(57) ABSTRACT

A method for providing sponsorship for a directory comprises permitting a search of the directory. The method further comprising displaying a search result on a page and incorporating a designated web page of a sponsor on the same page as the search result.

15 Claims, 14 Drawing Sheets

U.S. PATENT DOCUMENTS

| | | | |
|---|---|---|---|
| 6,338,085 B1* | 1/2002 | Ramaswamy | 709/217 |
| 6,374,241 B1* | 4/2002 | Lamburt et al. | 707/6 |
| 6,973,436 B1* | 12/2005 | Shkedi | 705/14 |
| 7,225,142 B1* | 5/2007 | Apte et al. | 705/14 |
| 2001/0011818 A1* | 8/2001 | Dockery et al. | 281/15.1 |
| 2002/0026349 A1* | 2/2002 | Reilly et al. | 705/14 |
| 2002/0049616 A1* | 4/2002 | Speicher | 705/4 |
| 2003/0055729 A1* | 3/2003 | Bezos et al. | 705/14 |
| 2005/0120023 A1* | 6/2005 | Wesinger et al. | 707/10 |
| 2007/0299682 A1* | 12/2007 | Roth et al. | 705/1 |

\* cited by examiner

FIG. 10

Yellow Pages Superhighway™    Add or Edit Your Listing    Search

Copyright © 1999 Yellow Pages Superhighway, Inc. All Rights Reserved. Patent Pending. Proprietary Information. Do not disclose without permission from YPS.

Arthur Beren Shoes
222 Stockton St, San Francisco, CA 94108

More Info   Map   Directions   SearchNear   SaveThis   CALL   (415) 397-8900

---

CDNOW

It's Madness!
The Entire Store is Up to 30% Off

See Jessica Simpson and Eve at WebSessions

| MUSIC | VIDEO | GIFTS | MY CDNOW | HELP | COSMIC Music Network |

News & Reviews | Sales & Specials | Top 100 | Downloads | Custom CDs

🛒 Shopping Cart contains 0 items

[Artist ▼] [           ] Find It!   Search Classical

Welcome                                          VISA CDNOW prefers Visa

Search by artist, album or song title, listen to sound samples and read reviews!

- New Visitors Guide
- Shopping at CDNOW is Secure
- Create an Account
- Earn FREE music! Join Fast Forward

Browse
- Rock
- Alternative/Indie
- Pop/R&B
- Hip-Hop
- Electronic/Dance
- Jazz
- Country
- Folk/Blues
- World
- Classical
- New Age
- Christian/Gospel
- Vocal/Theatrical
- Soundtracks
- Comedy/Spoken
- Kids/Family

Departments
- MTV CD Lounge
- VH1 Music Shop
- Billboard Charts
- Imports
- Greatest Hits
- Music Accessories

Gift Certificates
- Buy Gift Certificates
- Redeem Gift Certificates

Link to CDNOW
- Sell Music
Earn commissions on sales made through your web site.

About CDNOW
- Investor Info
- ClickRewards
- Jobs at CDNOW

Center Stage

Who Won? Find Out at Awards Central.
The show might be over, but we're still celebrating at Awards Central where all CDs from Grammy® winning musicians are 30% off.

See Eve, Sisqo and more!
Watch streaming video of Eve performing "Gotta Man" and Sisqo bringing down the house with his hot new "Thong Song" at CDNOW WebSessions!

What's Hot

New Release 30% Off
Wynonna Judd
New Day Dawning
List $10.98
Add to Cart $7.69

After appearing on the *Prince of Egypt* soundtrack and collaborating with the Dixie Hummingbirds, Wynonna returns with her sixth solo release.
🔊 Listen    Going Nowhere Featured Album 30% Off
Macy Gray
On How Life Is
List $16.97
Add to Cart $11.88

Nominated for the Best New Artist Grammy® and a Soul Train Award, Macy Gray is this year's success story. Save on all your favorite Soul Train nominees and winners.
🔊 Listen    Why Didn't You Call Me New Release 30% Off
Mccoy Tyner
With Stanley Clarke & Al

Sales & Special Offers

STOREWIDE sale 30% off
sale ends march 27, 2000 @ 11 AM ET

A Gael Force of Irish Music
Return to the Emerald Isle with select Celtic music.

Rock Style Merchandise from The Met Museum
You'll find all the official merchandise inspired by the Rock Style Exhibition at The Metropolitan Museum of Art, right here.

Live LARGE on CAMPUS -- Win $10,000!
Hey college students -- Need $10,000? Enter CDNOW's Get Rich Quick Sweepstakes, presented by Homestead.com, to win the cash or nearly 2000 other cool prizes!

Oscar® Alert! Own the Movies That are Making History.
Build an award-winning collection with the soundtracks from Oscar®-nominated films and past Best Picture Winners -- all up to 30% off.

More Sales & Specials...

allstar
CDNOW'S DAILY MUSIC NEWS

Backstreet Boy A.J. McLean To Play Solo Show

Strep Throat Silences Blink-182

FIG. 11 ated web page of a sponsor on the same page as
METHOD AND APPARATUS FOR PROVIDING SPONSORSHIP FOR A DIRECTORY

CROSS REFERENCE TO RELATED APPLICATION

The present application is a divisional of application Ser. No. 09/524,849 filed on Mar. 14, 2000 now U.S. Pat. No. 7,467,348.

FIELD OF THE INVENTION

The present invention relates to directories, and more specifically, to providing sponsorship in conjunction with displaying a search result.

BACKGROUND

Currently, there are number of different yellow pages and white pages available on the Internet. These yellow and white pages generally are free to the users. The providers of the yellow pages receive revenue through two primary methods: preferred placement of listings and banner advertising.

Preferred placement of listings means that someone who is in the yellow pages, a listee, can purchase a preferred placement, for a fee. The preferred placement places the listee's information at the top of the listing of names. Thus, for example, if Zibo's Shoes purchases a preferred placement, when a user searches for shoe stores, Zibo's listing will be at the top of the returned list of stores. If, however, Zibo's does not purchase a preferred placement, then, since most yellow pages are organized alphabetically, Zibo's will be at the bottom of the returned list. This is disadvantageous to Zibo's. Furthermore, preferred placement may be expensive, especially in areas that have large suppliers as well as smaller suppliers. It is unlikely that a small shop having only a few employees can compete with a retail giant for placement. Also, a user viewing these pages would see the listings in an unexpected order based on placement and would not be able to quickly locate Zibo's on the page. Therefore, this traditional method of gaining revenue is disadvantageous to the listees and users.

An alternative method of gaining revenue is by using banner advertising. Banner advertising places a banner ad, traditionally about six inches long and one inch wide, across either the top or the bottom of the page being shown. Clicking on the banner ad follows the link to the advertiser's site. However, payment for banner ads is based mostly upon an action on the user's part. While placement of a banner ad may result in payment in some instances, most payment is in response to a "click through", i.e., a user following the link provided by the banner ad and visiting the advertiser's web page. Click-through rates are low, and banner ads have not been found to be a sufficient source of revenue. Therefore, the use of banner ads is disadvantageous to the provider of the yellow pages.

SUMMARY OF THE INVENTION

A method for providing sponsorship for a directory comprises permitting a search of the directory. The method further comprises displaying a search result on a page, and incorporating a designated web page of a sponsor on the same page as the search result.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 illustrates one embodiment of a screen shot of a list of search results.

FIG. 11 illustrates one embodiment of a screen shot of a single listing that is sponsored.

DETAILED DESCRIPTION

A method of providing a searchable directory, and method of obtaining revenue, is described. A directory herein refers to a searchable list of items. For one embodiment, the search is in a set of online telephone listings, such as a yellow pages or white pages. Other embodiments may include a search directory of real estate currently on the market, a search of a single's directory, a white pages style directory of individual phone numbers, or a directory of e-mail addresses. Alternative directories may be used.

Figure 10:
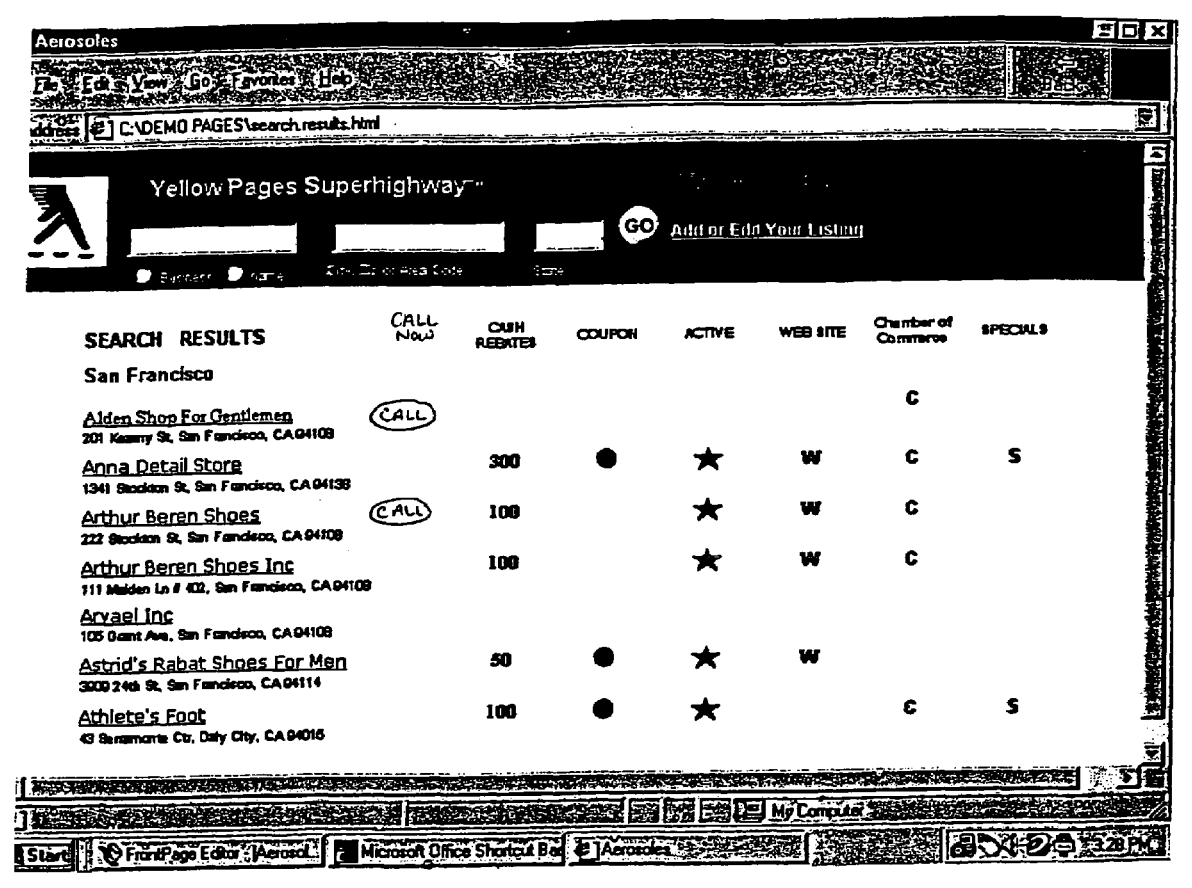

When the search result is displayed, a sponsor's information is incorporated with the page containing the search result. For one embodiment, the resulting web page incorporates listee information presented in HTML, attached to an HTML frame containing a web page of the sponsor of the particular listing. This permits the user to interact with the sponsor without having to "click through" and wait for a redirected page to load. This is advantageous to the user, since he or she can immediately interact with a sponsor, and advantageous to the sponsor, since no click-through is required, and the advertisement that reaches the user is a full page. Also, the user can immediately interact with the listee information, or with the directory, e.g., to make additional searches. An example of a list of search results is shown in FIG. 10, and an example of a single search result including a sponsor's page is shown in FIG. 11.

Sponsors need not generate a separate banner ads, but rather can use their front page—or any other page—to interact with the users. Other embodiments may incorporate the content information elsewhere on the screen or use a different method of incorporating the content with the sponsor's web page.

Furthermore, for one embodiment, the sponsor can purchase the sponsorship through an ad commoditizer. The ad commoditizer permits a sponsor to buy and sell sponsorships, either by fixed pricing or auction. The ad commoditizer also allows for sponsors to target their advertising more precisely.

For one embodiment, the system will also connect a user and a listee or sponsor if the user selects this option. For some embodiments, this may made by a voice over internet telephone call, a multimedia connection, or other means. For some embodiments such a call is free to the user, is charged to the listee, sponsor, or advertiser. For one embodiment, the call is made by the system to both parties and then connected, initiated by the user making a toll free call to the system. For some embodiments, the call may include additional data being passed, a call with verification of the parties involved, or a call with several of these attributes. These abilities may confer advantages to the user, such as free long distance calls, convenience in placing calls, or being sure of the identity of the party on the other side of the call. These abilities may confer advantages to the listee such as encouraging users to place more calls to the listee.

Figure 1:
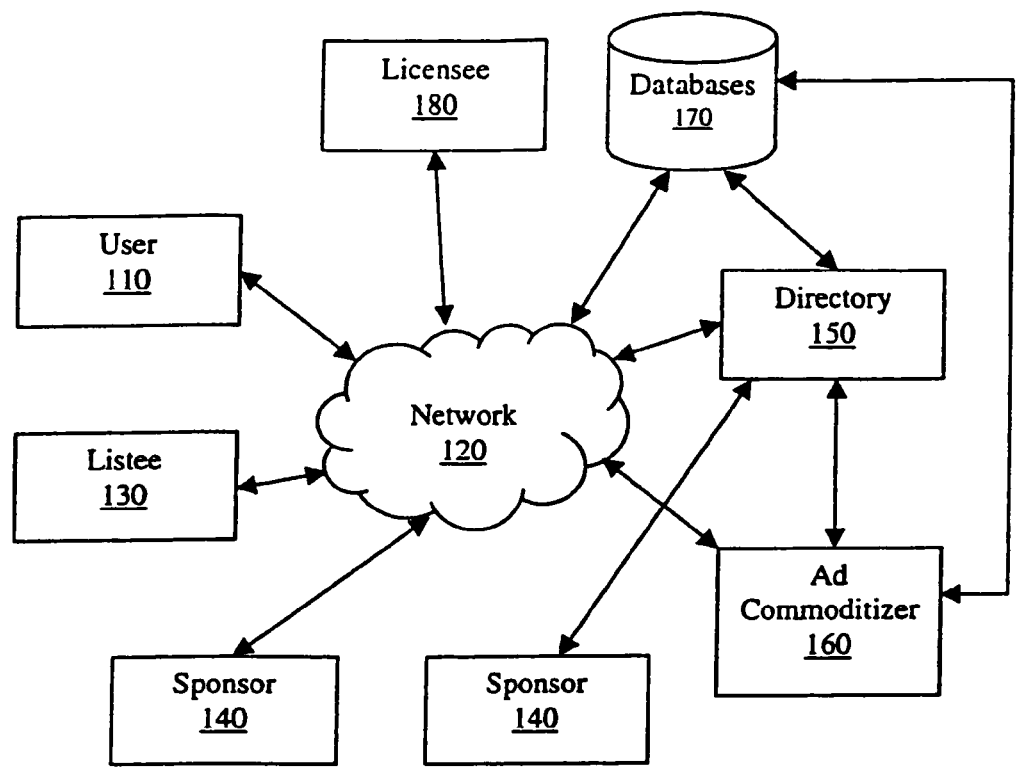
FIG. 1 is a block diagram of one embodiment of a network.

FIG. 1 is a block diagram of one embodiment of a network. Network 120 may be the Internet, a local area network (LAN), wide area network (WAN), a wireless network, or another type of network. Network 120 provides access to directory 150 by various users 110, listees 130, licensees 180, and sponsors 140. Although the network 120 is generally used as a connection among these units, embodiments also include connections using other means including e-mail, facsimile, telephone, or alternative communication means.

User 110 may use the directory 150 to look up certain data. For one embodiment, directory 150 may be a yellow pages telephone directory. For another embodiment, directory 150 may be an alternate directory, such as a white pages telephone directory, directory of e-mail addresses, directory of available real estate, dating personals, or another type of directory.

Directory 150 is coupled to databases 170. For one embodiment, databases 170 may be located within directory 150. Alternatively, databases 170 may be distributed databases. For yet another embodiment, databases 170 may include both internal databases, for items such as accounting and sponsorships, and external databases, for items such as yellow pages listings. For one embodiment, databases 170 may be replicated or mirrored for better performance. For one embodiment, databases 170 may be replicated by licensees 180. Although databases 170 are referred to as these mechanisms, any data arrangement/storage mechanism may be used that can store data in a retrievable form.

Directory 150 includes a plurality of listings. Each listing includes the data of a listee. Listees 130 may access directory 150 through the network 120 to alter their own listings. As described below in more detail, listees 130 may further access directory 150 and provide self-sponsorship to their own listings. Furthermore, listees 130 may be sponsors 140.

Sponsors 140 may also access directory 150, via network 120 to purchase sponsorships of certain groups of listees and/or users This is described in more detail below, in FIG. 7.

For one embodiment, ad commoditizer 160 may further be coupled to network 120. Ad commoditizer 160 is designed to sell the sponsorships for placement of spbnsor's information in the directory 150. As will be described in more detail below, ad commoditizer 160 permits a sponsor 140 to purchase sponsorships. Furthermore, for one embodiment, ad commoditizer 160 permits a broker to buy and sell sponsorships. For the remainder of this application, for simplicity, the term sponsor is used. However, it is to be understood that the term sponsor can refer to a broker. This type of commoditizing ensures that the sponsors 140 have optimal ability to target their advertising.

Licensees 180 may further be coupled to network 120. Licensees 180 may mirror directory 150, and use the databases 170 to display similar listings and sponsorships. For one embodiment, licensees 180 may be provided an incentive to mirror the directory 150, such as percentage of revenue.

Figure 2:
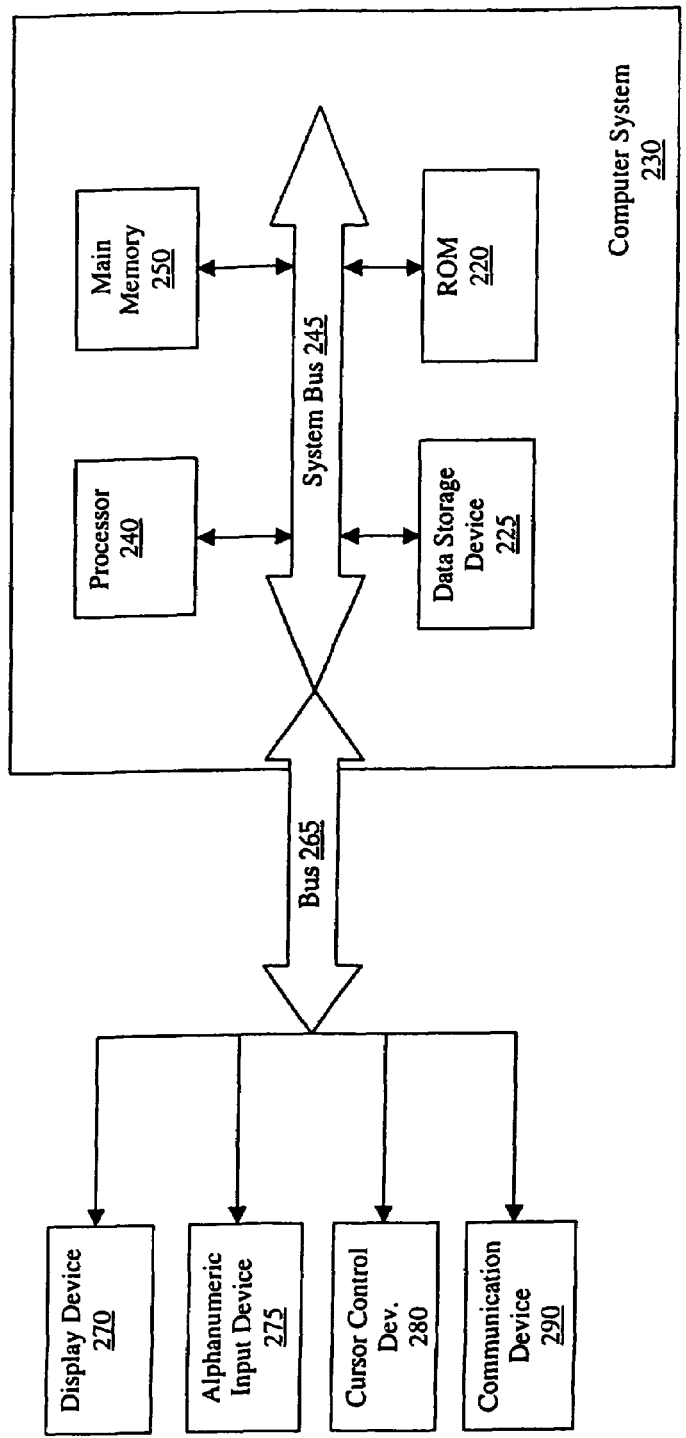
FIG. 2 is a block diagram of one embodiment of a computer system.

FIG. 2 is a block diagram of a computer system on which the software of the present invention may be implemented. It will be apparent to those of ordinary skill in the art, however that other alternative systems of various system architectures may also be used.

The data processing system illustrated in FIG. 2 includes a bus or other internal communication means 245 for communicating information, and a processor 240 coupled to the bus 245 for processing information. The system further comprises a random access memory (RAM) or other volatile storage device 250 (referred to as memory), coupled to bus 245 for storing information and instructions to be executed by processor 240. Main memory 250 also may be used for storing temporary variables or other intermediate information during execution of instructions by processor 240. The system also comprises a read only memory (ROM) and/or static storage device 220 coupled to bus 240 for storing static information and instructions for processor 240, and a data storage device 225 such as a magnetic disk or optical disk and its corresponding disk drive. Data storage device 225 is coupled to bus 245 for storing information and instructions.

The system may further be coupled to a display device 270, such as a cathode ray tube (CRT) or a liquid crystal display (LCD) coupled to bus 245 through bus 265 for displaying information to a computer user. An alphanumeric input device 275, including alphanumeric and other keys, may also be coupled to bus 245 through bus 265 for communicating information and command selections to processor 240. An additional user input device is cursor control device 280, such as a mouse, a trackball, stylus, or cursor direction keys coupled to bus 245 through bus 265 for communicating direction information and command selections to processor 240, and for controlling cursor movement on display device 270.

Another device, which may optionally be coupled to computer system 230, is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 240. Other storage media may include floppy disks, memory cards, flash memory, or CD-ROM drives.

It will be apparent to those of ordinary skill in the art that the methods and processes described herein can be implemented as software stored in main memory 250 or read only memory 220 and executed by processor 240. This control logic or software may also be resident on an article of manufacture comprising a computer readable medium having computer readable program code embodied therein and being readable by the mass storage device 225 and for causing the processor 240 to operate accordance with the methods and teachings herein.

The software of the present invention may also be embodied in a handheld or portable device containing a subset of the computer hardware components described above. For example, the handheld device may be configured to contain only the bus 245, the processor 240, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 3:
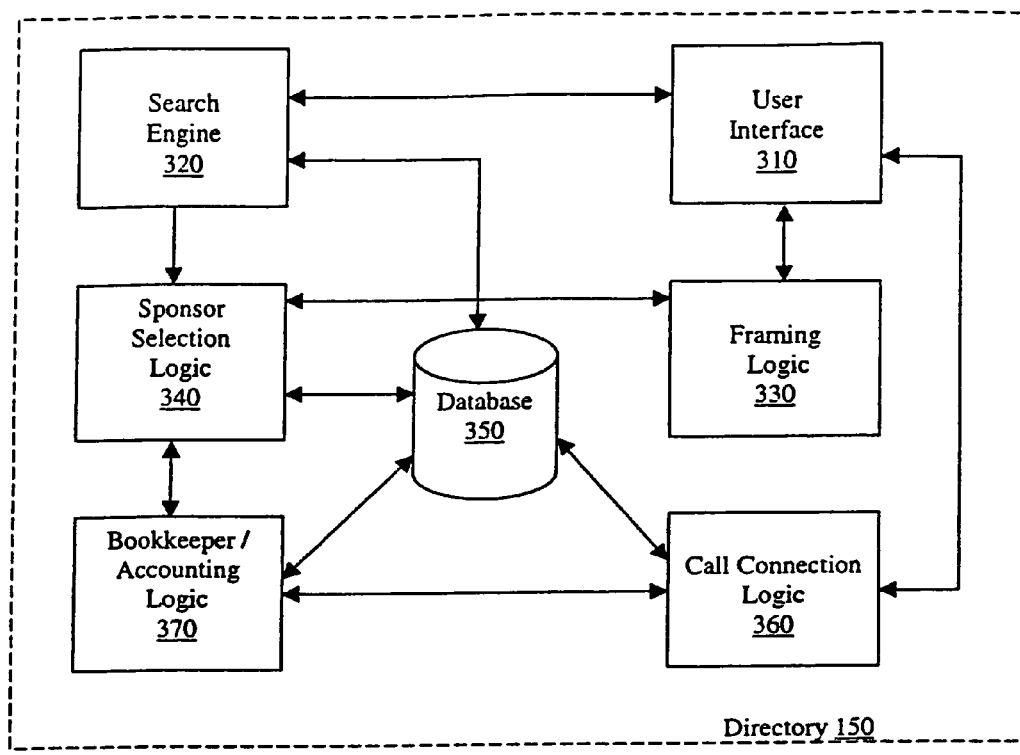
FIG. 3 is a block diagram of one embodiment of the search results server.

FIG. 3 is a block diagram of one embodiment of the directory 150. Directory 150 includes user interface 310. For one embodiment, user interface 310 is a web page. For other embodiments, the user interface 310 is an application on a wireless device, a Wireless Application Protocol (WAP) page, a dedicated client program, or other means. The user interface 310 permits a user to formulate a request for a lookup in database 350 using the search engine 320. For one embodiment, if a user accesses the system through a licensee 180 (not shown), the user interface may be modified to reflect the trademarks or look-and-feel of the licensee.

The request received from the user is passed to search engine 320. Search engine 320 searches the database 350 to find the responses to user's request.

Database 350 includes a plurality of listees, and various types of data about the listees. For one embodiment, the data may include data added by the listee, as well as data such as rebates, coupons, the availability of free calls to the listee, chamber of commerce memberships, recommendations by other users, or other types of data. For one embodiment, this data may be displayed with the search results.

The results found by search engine 320 are displayed to the user through user interface 310. An example of such a list is shown in FIG. 10. If the user selects one of the results for more detailed viewing, or if only one listee was found, the listee is passed to sponsor selection logic 340 by search engine 320. Sponsor selection logic 340 determines the appropriate sponsor to display with the selected listee from the sponsorships in the database 350. Sponsor selection logic 340 then retrieves the sponsor information from database 350, and passes it to framing logic 330. Framing logic 330 incorporates the sponsor information with the listee that was the search result.

For one embodiment, the sponsor information is a web page. For another embodiment, the sponsor's information may be a audio-visual or multimedia recording. For one embodiment, framing logic 330 frames the listee information in the web page with the sponsor's web page in an HTML frame below it. For one embodiment, the listee information may be incorporated at another location in the web page. For one embodiment, the sponsor's web page is displayed in its entirety. For one embodiment, the sponsor's listee information is incorporated along with the sponsor's information. Thus, for example, if the sponsor is CDNow, the user can freely navigate the CDNow front page, when he or she receives the search result. An example of this display is shown below in FIG. 11. For another embodiment, the framing logic 330 may incorporate data from the sponsor in the result. For one embodiment, the hypertext links in the incorporated sponsor's web page may be rewritten to keep navigation information for the bookkeeping/accounting logic 370.

Sponsor selection logic 340 further communicates with bookkeeping/accounting logic 370. In some cases, a sponsor is charged by the impression, i.e., the number of times a sponsor information is displayed. For one embodiment, an impression is a page view. Thus, bookkeeping/accounting logic 370 tracks the number of times the sponsor information is displayed, along with other data. This other data may include the category of the listing displayed (e.g. dentist in San Diego), or data about the user, e.g., that searcher is in a certain demographic group located in San Diego. This data may be used for statistical or accounting purposes. Furthermore, this data may be used to provide rewards or incentives to the user. This data may also be used to share revenues or provide incentives to licensees. For one embodiment, the user's individual privacy is guaranteed by the system and only cumulative data is provided to the sponsors, no individually identifiable data is provided.

For one embodiment, directory 150 may further include call connection logic 360. Directory 150 may provide the ability to make a connection on behalf of the user. For one embodiment, a "call now" or similar button is displayed with the result. If the user selects it, the listee data is forwarded to the call connection logic 360, and the call is initiated. For one embodiment, a "call now" or similar button is also displayed with the sponsor information. If the user selects that button, the sponsor information is forwarded to the call connection logic 360. For one embodiment, the call connection logic 360 is also connected to bookkeeping/accounting logic 370. This permits listees and sponsors to be appropriately changed for calls. This process is described in more detail below with respect to FIGS. 9A and 9B.

Figure 4:
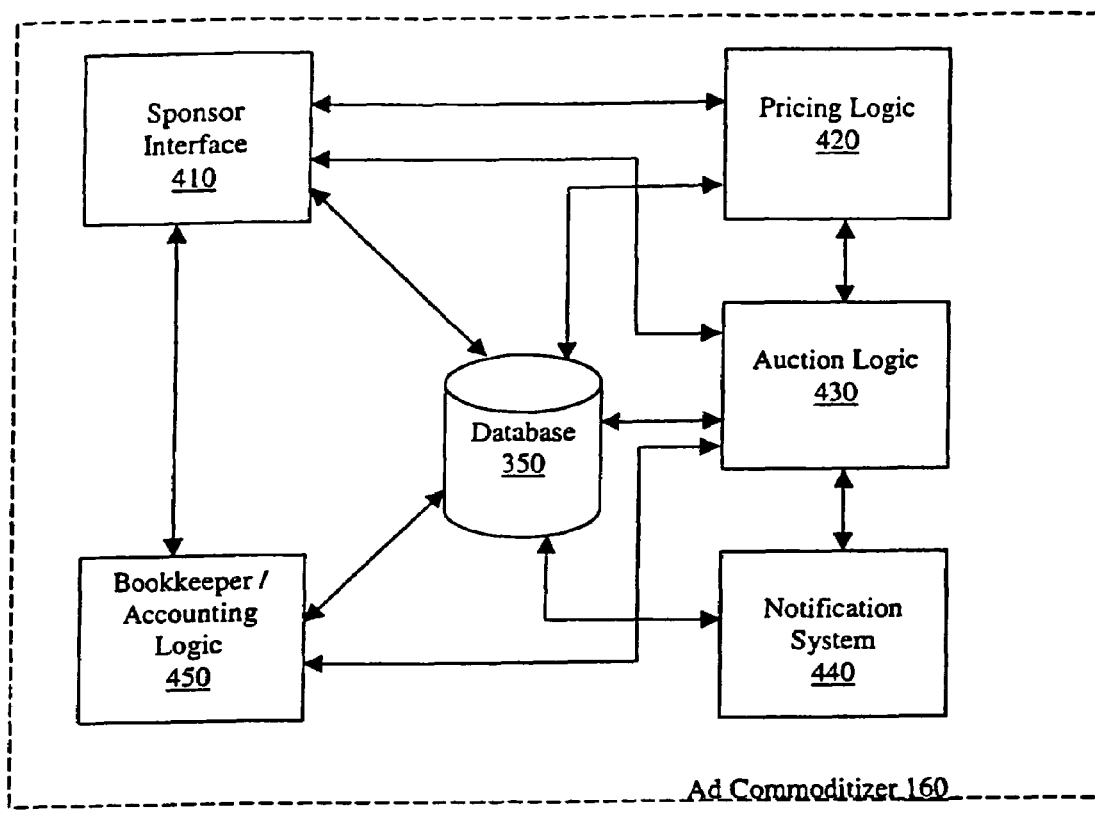
FIG. 4 is a block diagram of one embodiment of the advertising commoditizer.

FIG. 4 is a block diagram of one embodiment of the advertising commoditizer 160. Advertising commoditizer 160 includes a sponsor interface 410, which permits sponsors 140 and brokers to log into the system to buy and sell advertising. For one embodiment, sponsor interface 410 may be a web page, an application on a wireless device, a Wireless Application Protocol (WAP) page, a dedicated client program, or other means. Sponsor interface 410 permits a sponsor to search the database 350, to determine what groups are available for sponsorship. For one embodiment, sponsorship may be based on a variety of factors of the listee or the user, including: a ZIP code, a city, a demographic, a keyword, a Standard Industrial Classification (SIC), or an individual listing.

Note that the term "sponsor" refers to individual, group, or corporation that purchases a block of space for advertising. For one embodiment, the sponsor need not actually have any advertisement to display. Rather, a sponsor may act as a broker and purchase a block of space, and then resell it via the auction described below. Alternatively, a group may purchase a block, and allocate it among the participants in the group or resell portions using the ad commoditizer. In this way, the advertising commoditizer 160 permits various types of advertising purchases, including as speculation.

For one embodiment, the sponsorship may be based on listee data. For example, a sponsor may choose to sponsor listees that are orthodontists. Thus, when a user searches for an orthodontist, the sponsor's information may be the advertisement displayed. For one embodiment, the sponsorship may be based on user data. For example, the sponsor may chose to sponsor all searchers within a specific area. Thus, when a user from San Diego searches for any listee, the sponsor's information may be the advertisement displayed. This type of allocation is described in more detail with regard to FIG. 8B.

When the sponsor determines what group to sponsor, a price is quoted to the sponsor by pricing logic 420. For one embodiment, pricing logic 420 includes a current fixed price value for the sponsorship. For one embodiment, the prices in pricing logic 420 may be adjusted based on other sponsorship auctions.

If the sponsor chooses to accept the price offered by pricing logic 420, the sponsor is forwarded to the bookkeeper/accounting logic 450, where the terms of the sponsorship are recorded. For another embodiment, the sponsor may be billed for a number of impressions, e.g. page views. For another embodiment, the sponsor is billed periodically, based on the number of impressions displayed to the users a time period. For another embodiment, the sponsor may purchase a period of time as an exclusive sponsor, e.g., for November 1999. For one embodiment, the bookkeeper/accounting logic 450 also tracks revenue for splitting revenues or providing incentives to licensees 180. Alternative methods of billing the sponsors may be used.

If the sponsor declines the price offered by pricing logic 420, the sponsor may enter an auction bid for the selected group. Auction logic 430 receives the sponsor's bid, and notifies other sponsors who are interested in the same group. Auction logic 430 determines a winner of the auction, and notifies the winner through notification system 440. Notifications may be sent by e-mail, a pager service, made public, placed on a web page available to sponsors, by facsimile, by phone call, by means of a wireless service, or using other methods.

Each time sponsorships are purchased, whether outright or through an auction, the data is entered into database 350. Database 350 is then used by sponsor selection logic 340 (not shown) to select the appropriate sponsor for a result being displayed. In this way, the sponsor's information is displayed to users.

Although not shown in this Figure, sponsors may manage their sponsorships, offer their sponsorships for sale, change billing information, view current sponsorships, and change the sponsor information associated with each sponsorship. The details of this type of management are obvious to one of ordinary skill in the art.

Figure 5:
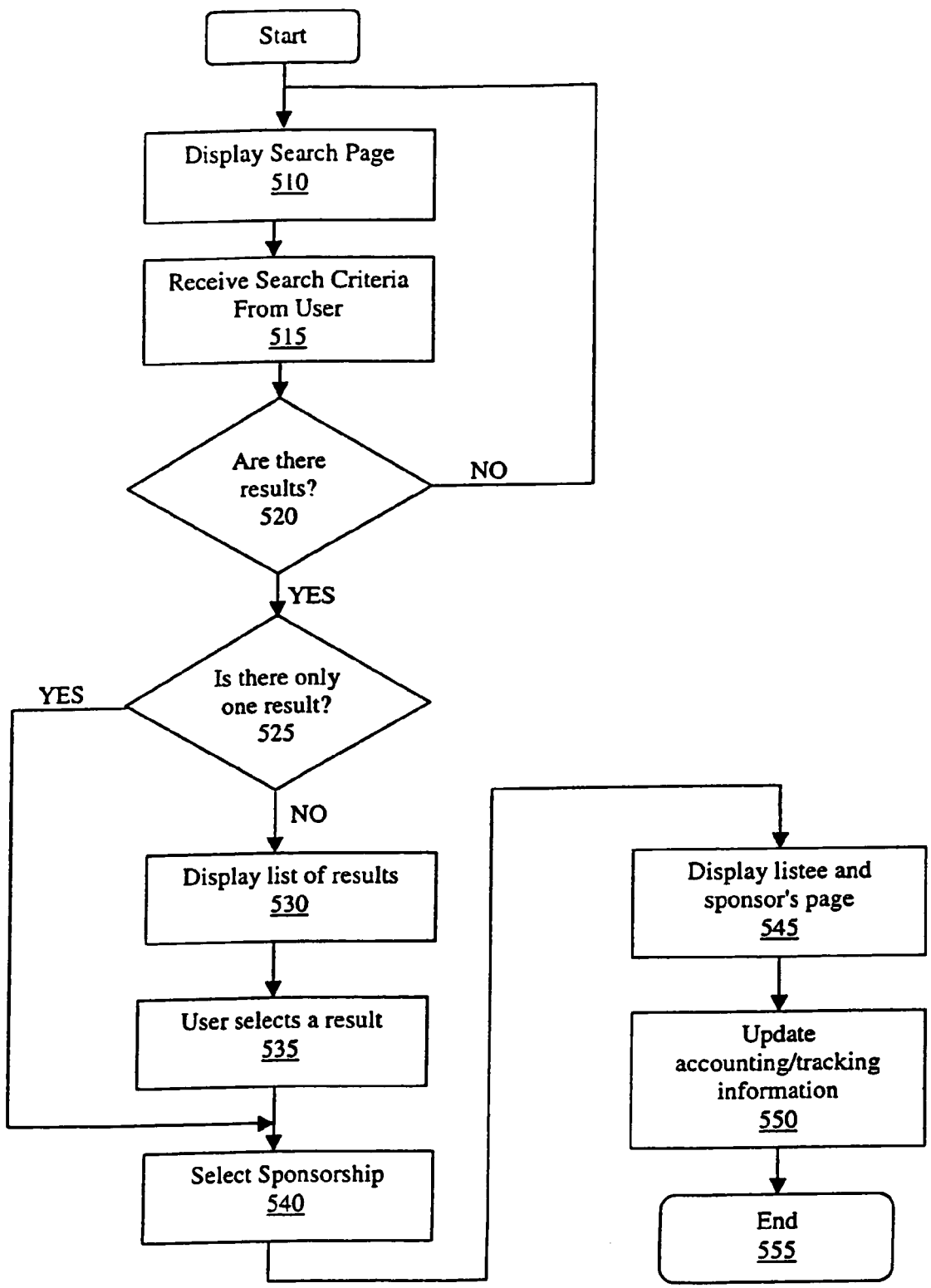
FIG. 5 is a flowchart of one embodiment of a user's interaction with the system.

FIG. 5 is a flowchart of one embodiment of a user's interaction with the system. The process starts at block 510, when a search page is displayed to the user. For one embodiment, the search page that is displayed permits the user to search by category, name, location, and/or other features.

At block 515, a search criteria is received from the user. For example, for a yellow pages directory, the search criteria may be "Doctors in San Diego, Calif." The search criteria may be entered manually, selected from a pull-down menu, or selected in another way.

The process then searches the database, and at block 520, determines whether there are any results. Note that results are listees. If there are no results, the process returns to block 515, permitting the user to modify his or her search criteria, in order to obtain results.

If results are found, the process at block 525 determines whether there is only one result. If there is only one result, the process continues directly to block 560. If there are multiple results found, the process continues to block 530. At block 530, the process displays a list of the results. FIG. 10 illustrates one embodiment of such a display.

For one embodiment, a key element of the results are missing in this display. For example, if the search is of a yellow pages, the telephone numbers may not be displayed on this page. For one embodiment, however, the user may directly make a call from this page by selecting a "call now" option. This option is discussed in more detail below, with respect to FIGS. 9A and 9B.

At block 535, the user selects one of the results. For one embodiment, the user would select the result in order to obtain the telephone number or other key element not displayed on the multiple listings page.

At block 540, the appropriate sponsorship for this listee is selected from the database. As discussed above sponsors purchase sponsorships to have their sponsor information incorporated with the listee information. There are several embodiments for selecting the appropriate sponsorship. For one embodiment, listees that have chosen to self sponsor (as described below with respect to FIG. 6 and shown in FIG. 12) have their own information incorporated as the sponsor. For one embodiment, the choice of sponsorship for each listee is assigned in batch either periodically or at the time sponsorship is purchased. For one embodiment, the sponsor selection logic selects from available sponsorships based on the highest bid. For one embodiment, the sponsor selection logic selects from available sponsorships based on a computation using the bid price, estimates of ease of fulfilling each sponsorship, and other factors. Issues where multiple sponsorships may be available are also discussed below in regards to FIGS. 8A and 8B.

Figure 12:
FIG. 12 illustrates one embodiment of a screen shot of a single listing that is self-sponsored.

At block 545, the information for the listee and the sponsor information for the selected sponsorship are incorporated together and displayed to the user. FIGS. 11 and 12 show this type of display. For one embodiment, the user may directly make a telephone call from this page by selecting the "call now" option. This option is discussed in more detail below, with respect to FIGS. 9A and 9B.

At block 550, the accounting/tracking information is updated. For one embodiment, this includes updating the number of impressions of the particular sponsor's information, as well as various data on the user and the result selected. For one embodiment, this includes tracking user demographics, when known. For one embodiment, this includes tracking the licensees in the user interaction. The process then ends at block 555. For one embodiment, the user may return to view another page, or return to block 530, the listing of all of the results, and select a different result to view, or execute a new search.

Figure 6:
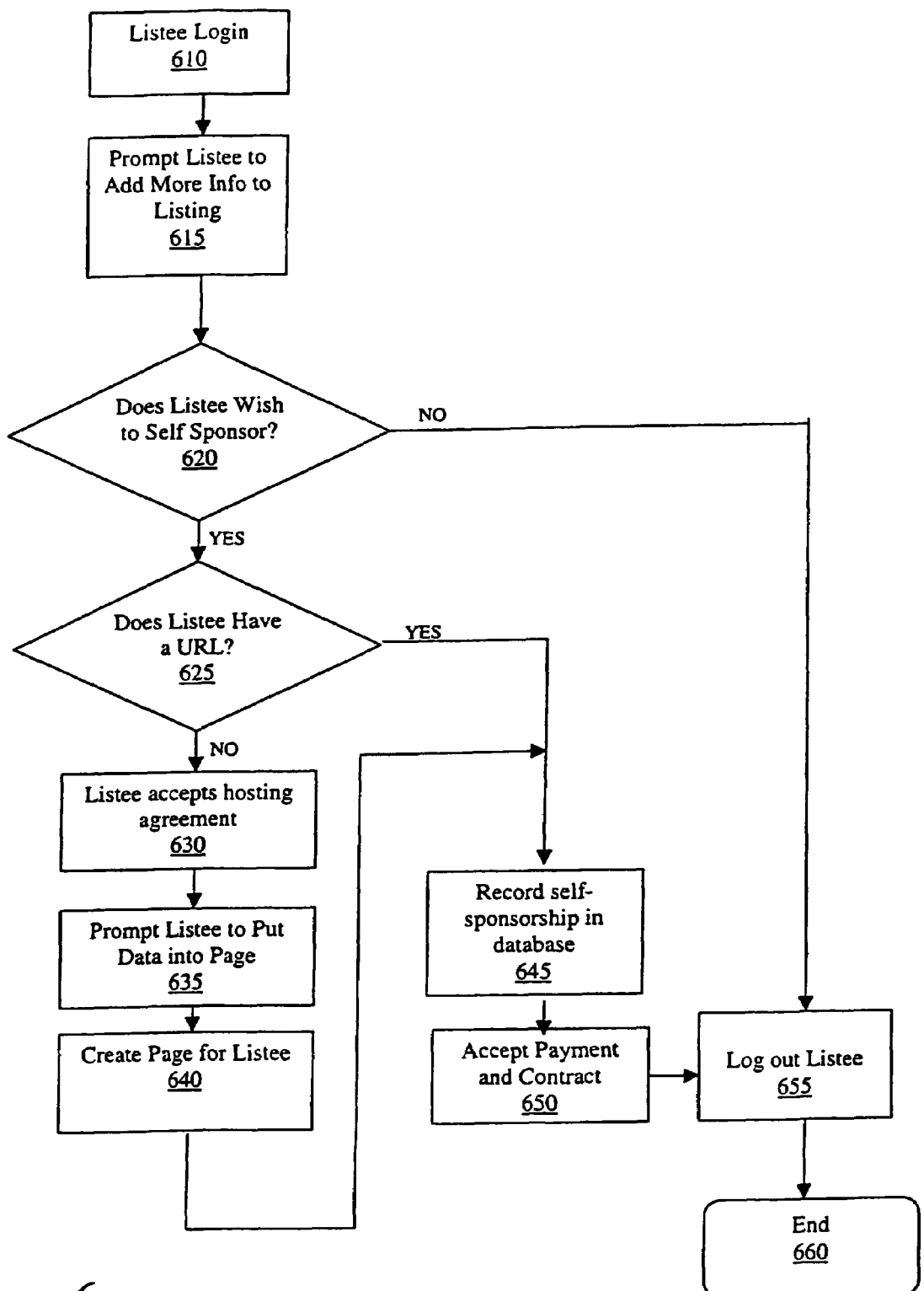
FIG. 6 is a flowchart of one embodiment of listee interaction with the system.

FIG. 6 is a flowchart of one embodiment of listee interaction with the system. The process starts at block 610, when a listee logs into the system. For one embodiment, listee log-in occurs on a web page. For one embodiment, the listee could identify him or herself to the system by placing a phone call from a known location. For one embodiment, the process could confirm the listee identity via an e-mail or phone call. For one embodiment, the process could allow the listee to a identify himself or herself from a web page and then verify via an e-mail or phone call. For one embodiment, the page referring the listee to the log-in screen is noted for accounting and future revenue sharing.

At block 615, the process prompts the listee to add more information to the listing. For one embodiment, for a listing in a yellow pages, this information could include business information such as hours, alternate telephone numbers, types of credit cards accepted, slogans, critics' ratings, or other data. FIG. 11 includes such additional data. For one embodiment, for a listing including individuals, this information could include personal information such as dating status, hobbies, or religious preference. For one embodiment, for a listing such as a property listing, this information could include property information such as size, number of bedrooms, number of bathrooms, and sales commission rates. For one embodiment, this information is added to the listing free of charge to the listee. This additional information is stored in the database of listee data.

At block 620, the system determines if the listee wishes to self sponsor. For one embodiment, this may include presenting the listee with current costs and terms for self sponsorship and waiting for a response. If the listee does not wish to self sponsor, the process continues to block 655, and the listee is logged out. For one embodiment, changes to listee data may be verified before they are added to the directory. The process then ends at block 660.

If the listee wishes to self sponsor the process continues to block 625. At block 625, the listee is prompted to identify whether the listee has a URL (Universal Resource Locator) ready for self-sponsorship. For one embodiment, the URL is limited to that of a web page. For one embodiment, the URL can be a web page or any audio-visual or multimedia content that can be incorporated with the listee's information. For one embodiment, any method of identifying content can be used in place of a URL. If the listee already has an existing URL he or she wants to use as the self-sponsorship information then the process continues to block 645. For one embodiment, this process may be discontinuous. In other words, a listee may decide to self-sponsor, but select to log in later to identify a URL, and/or create a page. If the listee does not have a URL, the process continues to block 630.

At block 630, the listee is presented with and prompted to accept a hosting agreement. For one embodiment, this hosting agreement may have additional fees associated with it. For one embodiment, this hosting agreement may be with a third party web hosting company. For another embodiment, block 630 may be skipped, and the listee may be directly referred to a third party web hosting system, and the present system would receive the URL generated by that third party web hosting system.

The system then guides the listee through designing a web page or other content at block 635. For one embodiment, this may involve entering information into on-line forms. Other methods of collecting information, graphics, and preferences to make a web page, are obvious to those of ordinary skill in the art At block 640, the system uses the information collected at block 635 to create a web page that can be accessed with a specific URL. The URL for this created page can than be used in the same way as if a the listee had an existing URL.

At block 645, the URL, either provided by the user at block 625 or created at block 640, is recorded in the database of sponsorships as the listee's self-sponsored information. Self-sponsorship is one specific method of sponsorship that applies only to the listee's own listings. For one embodiment, the listee's URL is stored with the listee's record in the database. For one embodiment, a page is composed with the listee information and the listee URL and stored as a single unit. FIG. 12 shows one embodiment of a display including self-sponsorship.

At block 650, the listee is prompted to pay and accept the self-sponsorship contract. Accounting information is then recorded in a database. For one embodiment, this type of sponsorship may be a fixed fee per time period. For one embodiment, this may be a fee based upon one transaction, e.g., until the sale of a property. For one embodiment, this fee may be based on the number of times a listee's page is viewed. For one embodiment, the payment is accepted via on online payment processing service. For one embodiment, the listee is required to accept accompanying terms and conditions with the contract. For one embodiment, the listee may be contacted when the term of service nears expiration. At block 655, the system logs out the listee, and the process ends at block 660.

Figure 7:
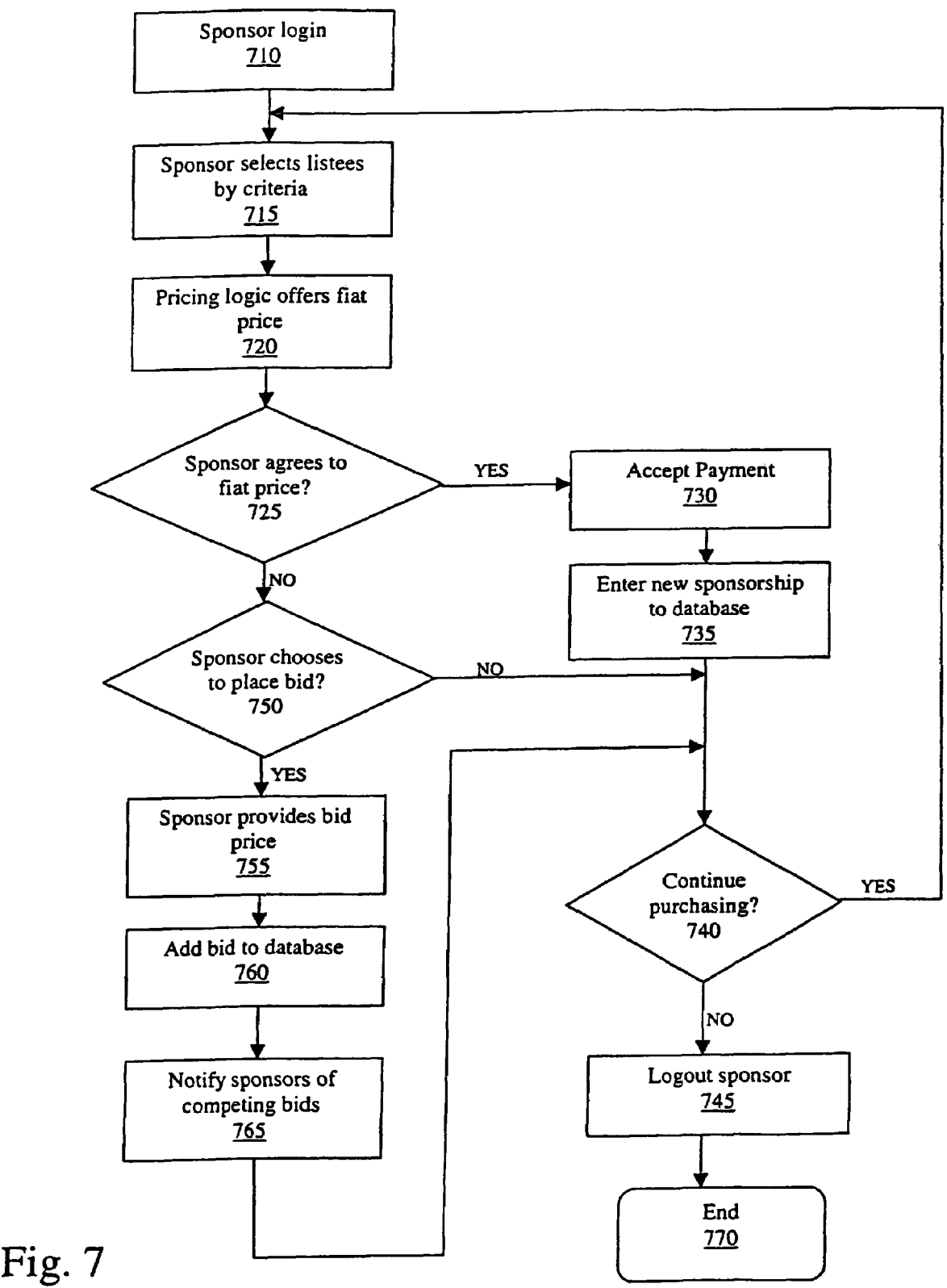
FIG. 7 is a flowchart of one embodiment of a sponsor interaction with the system.

FIG. 7 is a flowchart of one embodiment of a sponsor interaction with the system. The process starts at block 710 with the sponsor logging in and identifying himself or herself to the system. For one embodiment, sponsor log-in occurs on a web page. For one embodiment, the sponsor could identify him or herself to the system by placing a phone call from a known location. For one embodiment, the process could confirm the sponsor's identity via an e-mail or phone call. For one embodiment, the process could allow the sponsor to a identify himself or herself from a web page and then verify via an e-mail or phone call. For one embodiment, the page referring the sponsor to the log-in screen is noted for accounting and future revenue sharing.

For one embodiment, the sponsor could identify himself or herself by placing a phone call from a known location. For one embodiment, the page referring the sponsor to the login screen is noted for accounting and future revenue.

At block 715, the process prompts the sponsor to select a group of listings or users based on various available criteria. For one embodiment, these criteria could be entered with pull down menus. For one embodiment, these criteria could be entered in a form. For one embodiment, the criteria could be entered interactively, updating the available number of sponsorships as each criterion is chosen. Other means of selecting criteria may be used. For some embodiments, the criteria could include information about the listees including Zip codes, industry, SIC codes, area codes, geographic location, distance from another known location, size of the business, or other criteria. For one embodiment, criteria could include demographics, when known, about the user of the system. For example, a sponsor could select for users known to be located in California. Other criteria may be used.

For one embodiment, the sponsor is informed of the auction status and current high bid for auctions with similar sets of criteria. For another embodiment, the sponsor is not informed of the auction status or current high bid for auctions with similar sets of criteria. The sponsor can select a group that is available or in auction.

At block 720, pricing logic computes a fiat price offered to the sponsor to purchase the sponsorship for group. For one embodiment, this fiat price could apply to a set number of impressions. For one embodiment, it could apply to a set period of time. In yet another embodiment, it could apply to a combination of impressions and time. For one embodiment, the fiat price is computed from the historical average of prices of similar previous sponsorships. For one embodiment, the fiat price is adjusted based on current and previous auction prices. For one embodiment, the fiat price is adjusted based on the expected impressions, and current indications of demand for sponsorship, including active auctions. For one embodiment, the fiat price is adjusted based on what other sponsorships and business relationships exist with the sponsor. For one embodiment, the fiat price is always higher than the current highest bid price for auctions with the same or similar criteria.

At block 725, the process determines whether the sponsor agrees to this fiat price. The sponsor may choose to accept this fiat price and proceed to payment and sponsorship as described at block 730. Alternately the sponsor may decline to pay the fiat price. For one embodiment, the fiat price may be an offer good for a specific period of time, for example one day. For one embodiment, the fiat price may have to be accepted or declined immediately. For some embodiments, the sponsor may have the option of paying additional fees for demographic information about the user (when known) viewing the sponsorship information or information about the specific listees incorporated with the sponsorship information.

If the sponsor accepted the fiat price at 725, then, at block 730, the process accepts payment for the sponsorship. For one embodiment, payment may be made using an online credit card acceptance service. For one embodiment, the system may only record the promise to pay and bill the sponsor for all related sponsorships using an accounting system.

For some embodiments, some or all of the sponsorship being purchased may have been offered by a broker and the process will arrange for some or all of the payment to be directed to the broker.

At block 735, the new sponsorship is added to the database. For one embodiment, the sponsor enters a URL as sponsor information for this sponsorship. For one embodiment, the URL is limited to that of a web page. For one embodiment, the URL can be a web page or any audio-visual or multimedia content that can be incorporated with a listee's information.

The record and terms for the sponsorship are added to the database so that the sponsorship can be selected by the sponsor selection logic.

At block 740, the sponsor has the option of continuing to purchase sponsorships or of exiting the system. If the sponsor chooses to continue purchasing sponsorships, the process returns to block 715. If the sponsor chooses to exit the system, the system logs out the sponsor at block 745 and the process exits at block 770.

If the sponsor chooses not to accept the fiat price at block 725, the process continues to block 750. The sponsor is given the option to place a bit and enter into an auction for this sponsorship. For one embodiment, this auction may be combined with an existing auction with the same criteria. For one embodiment, this auction may be combined with an existing auction of similar criteria. For one embodiment, this offer to enter into auction may include modified terms. For one embodiment, these modified terms may include a lack of guarantee that the contract will be completed. If the sponsor chooses not to enter into auction for this sponsorship, the process continues to block 740.

If the sponsor agrees to place a bid, the process continues at block 755. At block 755, the sponsor is asked to enter a bid price. For one embodiment, a minimum bid price is computed as a function of similar auctions. For one embodiment, a minimum bid is computed from historical data. For one embodiment, the minimum bid adjusted by other auctions currently taking place or other indications of demand.

At block 760, the bid is recorded in the database. For one embodiment, the sponsor is asked for a URL of sponsor information for this sponsorship, as described above. For one embodiment, the sponsor is asked to select a notification format.

At block 765, sponsors of competing bids are notified of this bid using the notification system. For one embodiment, a competing bid may be determined as one made for an auction with the same or similar set of criteria. For one embodiment, a competing bid may be determined as a bid for an auction with overlapping areas as explained below with regard to FIG. 8B. For one embodiment, a competing bid may be determined as a bid for an auction with a similar set of selected criteria such that it is unlikely that both sponsorships could be fulfilled.

After notifying sponsors of competing bits, the process continues to block 740.

Figure 8A:
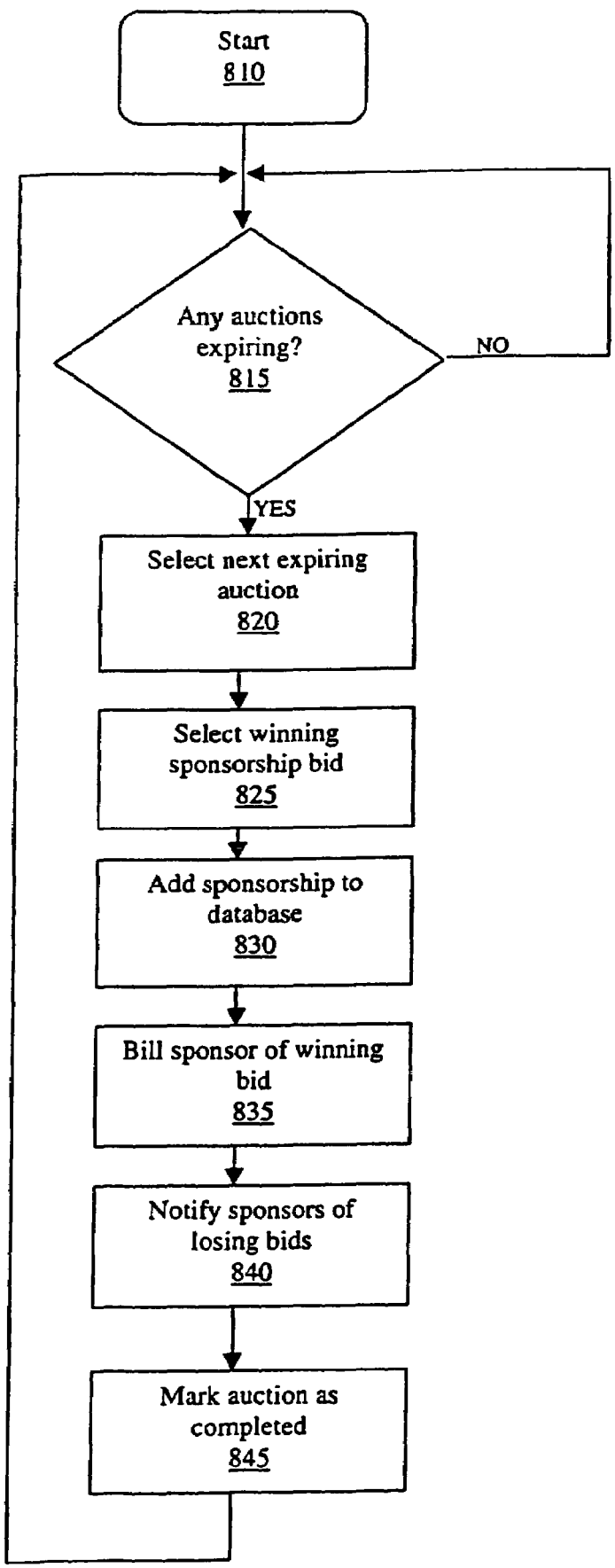
FIG. 8A is a flowchart of one embodiment of auction resolution.
Figure 8B:
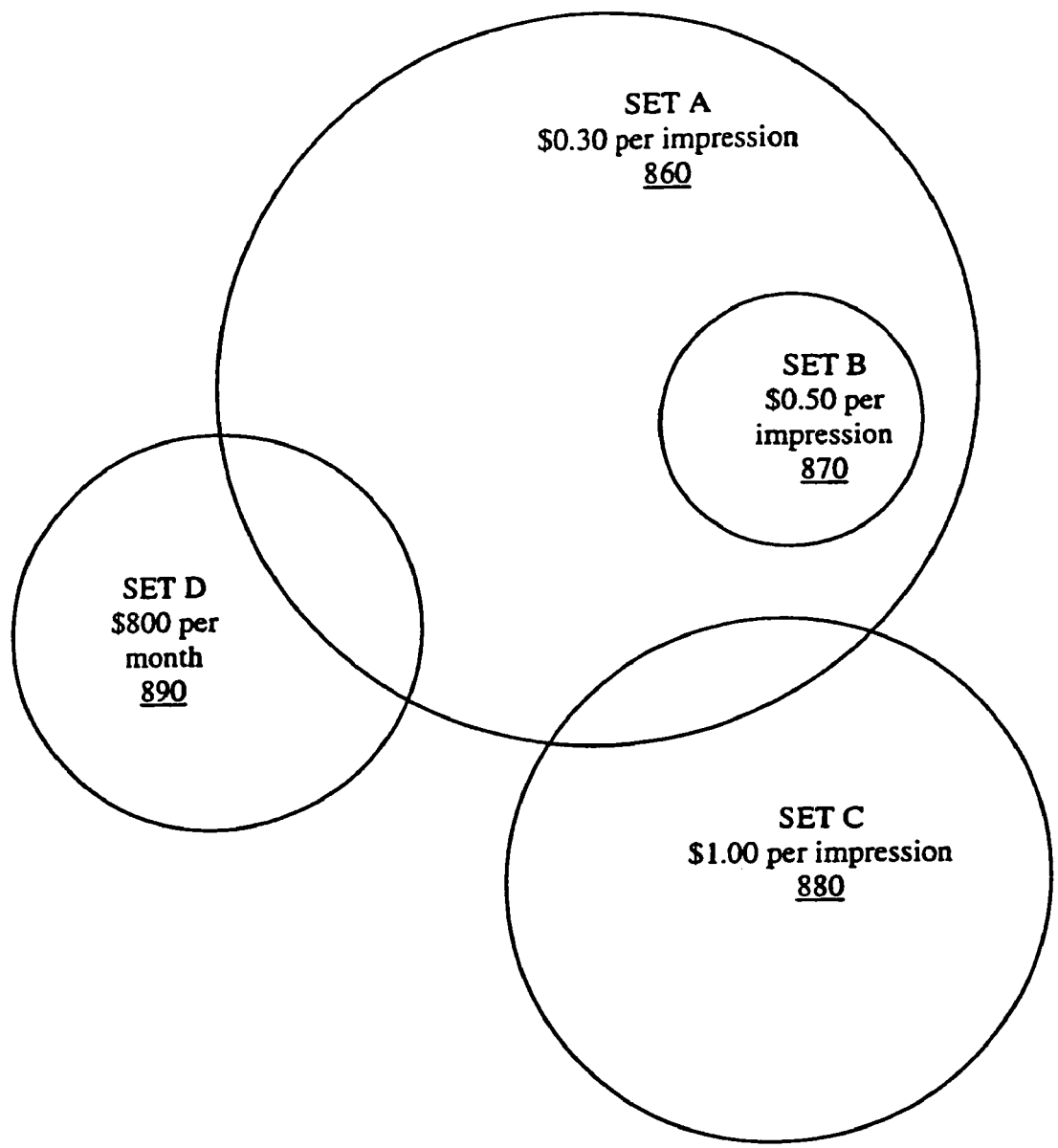
FIG. 8B is a Venn diagram of one embodiment of auction resolution.

FIG. 8A is a flowchart of one embodiment of auction resolution. The process starts at block 810. The process then continually checks for expiring auctions at block 815. An auction can expire after a specified time period, after a certain number of bids, by operator intervention, or after a period of time has elapsed in which no new bids are entered. For some embodiments, an auction expires because the process determines that it is unlikely, or that the likelihood is reduced, that the sponsorship offered by this auction could be fulfilled. This could occur when self-sponsorship reduces availability. This could occur when a new sponsorship with similar criteria to the current auction is accepted, either from a different completed auction or by a fiat price purchase. FIG. 8B explains some issues associated with supply estimation among same and similar auctions. A person ordinarily skilled in the art could determine other methods of expiring, or terminating an auction.

If no auctions are expiring, the system waits until an auction is expiring (returns to block 815). For one embodiment, the system may monitor for internal or external events that signify an auction is expiring.

If any auctions are expiring, the process continues at block 820. At block 820, the system selects the next expiring auction from the set of active auctions.

At block 825, the system selects the winning sponsorship bid for this auction. For one embodiment the winning sponsorship bid is simply the highest price bid. For one embodiment, the winning sponsorship may be selected based on the highest expected return from satisfying that bid. For example, a long term medium priced contract may be selected over a short term but higher priced contract. For one embodiment, no bid is guaranteed to win an auction, the auction may end with no winners. For one embodiment, multiple bids will accepted, limited by the expected ability to fulfill those contracts. The process then continues to block 830. If multiple bids are accepted, then each accepted bid continues to block 830.

At block 830, an accepted bid is converted to a sponsorship and is added to the database so that the sponsor selection logic can select that sponsor. For one embodiment the sponsor is requested to a provide URL for sponsorship information if that information is not already in the database. This request may be made through e-mail, the notification system, or other means.

At block 835, the sponsor of the winning sponsorship is billed. For some embodiments, some or all of the sponsorship being purchased may have been offered by a broker and the process will arrange for some or all of the payment to be directed to the broker.

At block 840, sponsors not selected are notified. For one embodiment, the notifications can be sent using the notification system. At block 845, the auction is marked as completed and the process continues to block 815.

FIG. 8B is a Venn diagram explaining some issues of supply estimation among same and similar auctions. Each set 860, 870, 880, and 890 represents a set/group of listees that can be sponsored, and the diagrams show an illustrative price for this sponsorship represented as either a cost per impression or cost per time period. Because each time a listee's information is viewed, only one sponsor's information can be incorporated with that listee's information, care must be taken when accepting sponsorships not to exceed the available supply of listees or listee impressions.

For example, accepting an exclusive contract for all impressions of set A 860 precludes accepting a sponsorship of set B 870, and diminishes the portion of listees and impressions available for sponsorship from set C 880 and D 890.

For one embodiment, after a sponsorship of impressions of set A 860 are sold, it may be possible to sell another sponsorship for set A if the total impression requirements of both sponsorships are less than or equal to the expected impressions of set A.

For one embodiment, even after a sponsorship of impressions of set A 860 are sold, sponsorships of set B 870 may be sold without a guaranteed minimum number of impressions. This may provide impressions to the sponsor of set B either when all the impressions in for the sponsorship of set A have been used, or on an alternate basis.

For one embodiment, if a listee is present in both set A and set C, then the sponsorship for set C will be chosen as the sponsor incorporated with the listee because of the higher impression price of set C. For one embodiment, the sponsorship for set A may be chosen to fulfill the sponsorship requirements of set A. For one embodiment, sponsorships of sets A and C may be chosen alternately based on a schedule. For one embodiment, this schedule may be based on the ratios of number of impressions or value of impressions purchased for the sponsorships of sets A and C.

Set D 890 shows a time period purchase with no number of impressions. For one embodiment, set D may purchase all impressions for a time, or some ratio of impressions for a time. If all impressions are purchased, and a listee in present in both set A and set D, then the sponsorship for set D will be chosen until the time period expires.

Figure 9A:
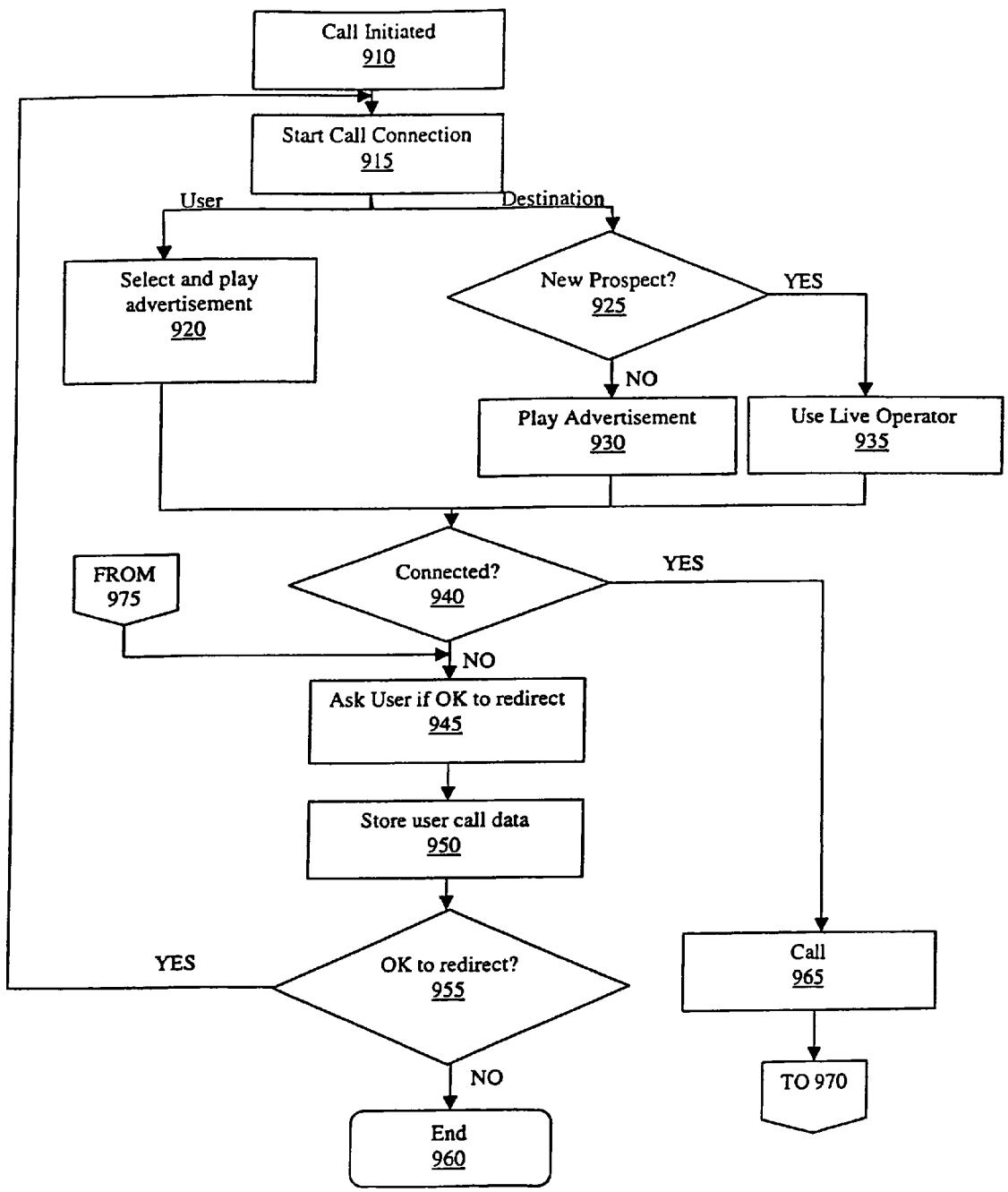
FIG. 9A-B are flowcharts of one embodiment of automatic call connection.
Figure 9B:
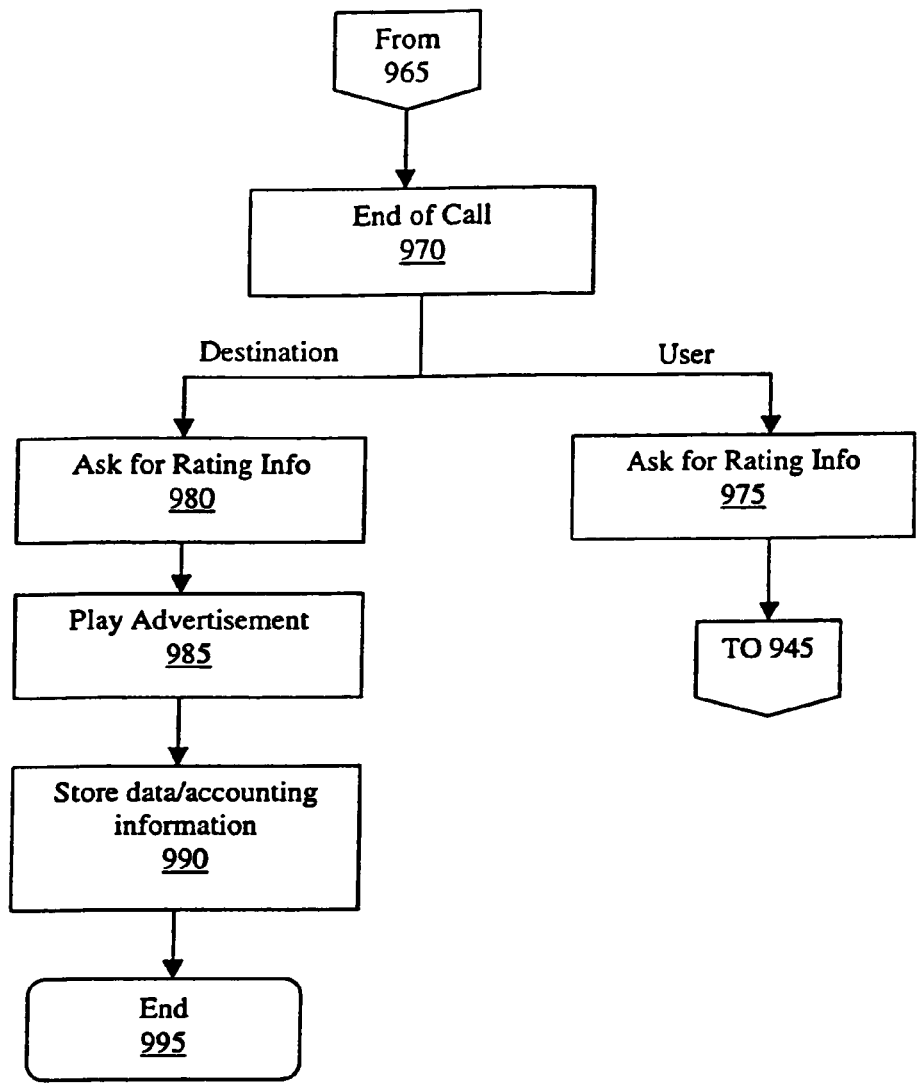

FIGS. 9A and 9B are flowcharts of one embodiment of automatic call connection. The process starts at block 910 wherein the call is initiated. When the process is initiated the first call destination is set by the process initiator. In most embodiments, the first call destination is the listee or sponsor for which the user has pressed a "call now" or similar button.

At block 915, the call connections are initiated. Two connections are initiated: one between the user and the system, and one between the system and the destination listee or sponsor. A connection represents a real time communications path between parties. The connections may be voice only calls, may be made over the public telephone system, may be made as Internet Protocol (IP) telephony calls, may be multimedia calls or may include text, graphics and web pages. For one embodiment, the connections may include authentication of parties involved, may transmit additional information about the parties involved, or may transmit demographic information about the parties involved.

For one embodiment, the connection between the user and the system is made via a telephone call initiated by the user. For one embodiment, the connection between the user and the system is made via a telephone call initiated by the system. For one embodiment, additional information is transmitted to better interact with an automatic call distributor (ACD) or call center.

For one embodiment, the user is not charged for the call. For another embodiment, the sponsor is charged for the call. For one embodiment, the listee is charged for the call.

After initiating these two call connections, the process continues to blocks 920 for the user and to block 925 for the destination.

At block 920, the process selects and plays an advertisement to the user. For one embodiment, this may include instructions. For one embodiment, when the destination is a listee, this advertisement may be on behalf of the sponsor of the listee selected. For one embodiment, this advertisement may include content hosted on a sponsor's system. For one embodiment, this advertisement may include sound and multimedia. For one embodiment, this advertisement may include both an audio portion as well as advertisement played on the user's computer screen. For one embodiment, the sponsor for this call may be different than the sponsor of the listee that the user is calling. After playing this advertisement, the process continues to block 940.

At block 925, the process determines if the destination is a new prospect for becoming a sponsor or for self-sponsorship. Thus, if the destination is a sponsor instead of a listee, it is not a new prospect. For one embodiment, this determination is made based on the number of times this destination has been called using this system. For some embodiments, this determination takes into account the availability of live operators, time of day, and business hours of the destination if known. If the destination is judged to be a good new prospect, control is passed to block 935. A live human operator announces the incoming call from the user, and may explain about the service or otherwise try to further a sales process. If the destination is not judged to be a good new prospect, an appropriate recorded or generated message may be played to the destination at block 930. For one embodiment, this message indicates that the source of the call is the directory, system, and/or the appropriate licensee. From either 930 or 935, the process continues to block 940.

At block 940, the process waits for the two simultaneous paths started from block 915 to reach this point. If both the user and listee successfully connect, the process continues to block 965 and the system connects the user and destination for the call. However, if either the user or listee are unable to connect, or disconnect during the advertisement, the process continues to block 945.

At block 945, a message may be played to the user asking the user to approve redirection, that is, to be connected to another sponsor. For one embodiment, this sponsor may not be the original sponsor of the listee. For one embodiment, alternate sponsors may be chosen after a connection has been attempted to the primary sponsor. For one embodiment, if the user has disconnected, a new connection is established with the user. At block 950, all the particulars of the call are stored in a database.

At block 955, the process determines if the user consented to being redirected. Any connection still open to the destination is closed. For one embodiment, this determination is made by an affirmative action from the user, such as touching a number on a phone keypad or clicking on a button. For one embodiment, inducements to the user, such as rewards program points, are offered for accepting the redirection. For one embodiment, the user remaining connected is viewed as consent. For one embodiment, if the user has disconnected, the process ends at block 960. If the process determines the user allowed redirection, then the process continues by selecting an appropriate sponsor as the new destination and continuing to block 915. Otherwise, the process terminates at block 960.

From block 940, if both the user and destination are connected, the process continues to block 965. At block 965, the user and the destination are connected. For one embodiment, this connection has a limited duration. For some embodiments, the connection has a longer or unlimited duration if the destination is a sponsor or a listee that has self-sponsored. For one embodiment, a warning is given before the connection is terminated. For one embodiment, the user and destination are instructed to break the connection by pressing a button or icon. The process continues to block 970 when the call ends from either the process determining to break the connection between the user and the destination, or by either the user or destination breaking the connection. For one embodiment, if the user or destination hangs up, a new connection is made with them before continuing. When the call is disconnected, the process continues to block 980 for the destination and block 975 for the user.

At block 975, the user is asked to provide rating information. For one embodiment this information includes ratings about the service received from the destination. For one embodiment, this information includes a rating used to refine matching in a dating service. For one embodiment, this information includes a rating of the directory or system. For one embodiment, information may include the user indicating if a purchase was made, the level of courtesy shown, or the truthfulness of advertised statements. For one embodiment, if the directory is a singles service, information may include a rating of the desire to meet again. The process then continues the user's connection with block 945.

At block 980, the destination is asked to provide rating information. For one embodiment, this information includes rating of the worth of the user as a potential customer, singles date, etc. For one embodiment, this information includes a rating indicating if a purchase was made. For one embodiment, this information includes a rating of the directory or system.

The process continues to block 985 where an advertisement may be played. Information and particulars about this call are then stored in a database at block 990. For one embodiment, this information may include information used to drive profit sharing among licensees. The process then terminates the connection to the destination and ends the destination's process at block 995.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A data storage medium with computer-executable instructions for marketing and selling sponsorship of a directory listing in a system that displays directory listings in response to search criteria submitted by a user comprising:
   instructions for presenting a listing from the directory listing to the user based on the search criteria;
   instructions for determining if a sponsor for the listing exists based upon the search criteria and a bidding process where a highest bidder for the search criteria is selected as the sponsor for the listing;
   instructions for evaluating if a listee that is not the highest bidder in the presented listing has paid to self-sponsor and remove the selected sponsor for the listing when the selected sponsor would otherwise have sponsor information presented with listee information based upon the search criteria; and
   instructions for, based upon the listee self-sponsor payment evaluation, transmitting listee self-sponsor information to the user for use in generating a display if the listee self-sponsor payment was made, and if the listee self-sponsor payment was not made, transmitting the sponsor information to the user for use in generating the display.

2. A method for marketing and selling sponsorship of a directory listing within a system that displays directory listings in response to search criteria submitted by a user, the method comprising:
   presenting a listing from the directory listing to the user based on the search criteria;
   determining if a sponsor for the listing exists based upon the search criteria and a bidding process where a highest bidder for the search criteria is selected as the sponsor for the listing;
   evaluating if a listee that is not the highest bidder in the presented listing has paid to self-sponsor and remove the selected sponsor for the listing when the selected sponsor would otherwise have sponsor information presented with listee information based upon the search criteria; and
   based upon the listee self-sponsor payment evaluation, transmitting listee self-sponsor information to the user for use in generating a display if the listee self-sponsor payment was made, and if the listee self-sponsor payment was not made, transmitting the sponsor information to the user for use in generating the display.

3. The method of claim 2, wherein the listee self-sponsor information includes contact information related to the listee self-sponsor.

4. The method of claim 2, wherein the sponsor information includes a Universal Resource Indicator (URI).

5. The method of claim 4, further comprising:
   recording the URI in a database of sponsors.

6. The method of claim 4, wherein the URI is a web page.

7. The method of claim 4, wherein the URI is multimedia content.

8. The method of claim 2, wherein the sponsor information includes a web page.

9. The method of claim 2, wherein the sponsor information includes multi-media objects.

10. The method of claim 2, wherein framing information frames the listee information in a web page and the sponsor information in an HTML frame.

11. The method of claim 2, further comprising:
    navigating the listee information if the listee self-sponsor payment was made.

12. The method of claim 2, further comprising:
    navigating the sponsor information if the listee self-sponsor payment was not made.

13. The method of claim 2, wherein the search criteria includes at least one of: a zip code, a city, a demographic, a keyword, industry name, and size of business.

14. The method of claim 2, further comprising:
    transmitting framing information to the user for use in generating the display.

15. The method of claim 2, further comprising:
    transmitting HTML to the user for use in generating the display.

* * * * *